United States Patent
Leroux et al.

(10) Patent No.: US 11,402,026 B2
(45) Date of Patent: Aug. 2, 2022

(54) FLOW CENTRALIZER FOR VALVE ASSEMBLY

(71) Applicant: Slurryflo Valve Corporation, Edmonton (CA)

(72) Inventors: Marc Leroux, Edmonton (CA); Brendan Romano, Edmonton (CA); Amir Emami, Edmonton (CA)

(73) Assignee: SlurryFlo Valve Corporation, Edmonton (CA)

(\*) Notice: Subject to any disclaimer, the term of this patent is extended or adjusted under 35 U.S.C. 154(b) by 0 days.

(21) Appl. No.: 16/510,725

(22) Filed: Jul. 12, 2019

(65) Prior Publication Data
US 2020/0400239 A1   Dec. 24, 2020

(30) Foreign Application Priority Data
Jun. 19, 2019 (CA) ............................... CA 3047289

(51) Int. Cl.
| | |
|---|---|
| *G05D 7/01* | (2006.01) |
| *F16K 3/32* | (2006.01) |
| *F16L 55/027* | (2006.01) |
| *F16K 47/08* | (2006.01) |

(52) U.S. Cl.
CPC ............... *F16K 3/32* (2013.01); *F16K 47/08* (2013.01); *F16L 55/027* (2013.01)

(58) Field of Classification Search
CPC ......... F16K 47/16; F16K 47/08; F16L 55/027
USPC ........................................... 138/44; 251/118
See application file for complete search history.

(56) References Cited

U.S. PATENT DOCUMENTS

| | | | | |
|---|---|---|---|---|
| 963,842 | A | * | 7/1910 | Willliams ............... F16K 47/08 251/118 |
| 1,518,279 | A | * | 12/1924 | Smoot ..................... G01F 1/372 73/861.51 |
| 1,753,524 | A | | 4/1930 | Mawby |
| 1,953,110 | A | * | 4/1934 | Holtanetheodore .... E21B 43/12 138/44 |
| 2,011,100 | A | | 8/1935 | Woods |
| 2,550,984 | A | | 5/1951 | Ferguson |
| 2,701,117 | A | | 2/1955 | Bashark |
| 2,731,231 | A | | 1/1956 | Garrott |

(Continued)

FOREIGN PATENT DOCUMENTS

| | | |
|---|---|---|
| CA | 2560666 C | 10/2005 |
| EP | 2287538 A1 | 2/2011 |

(Continued)

OTHER PUBLICATIONS

Integral, Macmillan Dictionary, printed Jul. 2020.*

(Continued)

*Primary Examiner* — Robert K Arundale
(74) *Attorney, Agent, or Firm* — Christensen O'Connor Johnson Kindness PLLC

(57) ABSTRACT

There is a valve assembly including a flow control valve and a flow centralizer. The flow centralizer has a flowthrough bore. The flow centralizer is downstream of the flow control valve and the flowthrough bore narrows in a direction downstream of the flow control valve. The flow centralizer may have a three-piece design including an insert defining the flowthrough bore and an orifice body and a flange ring which hold the insert in place within the orifice body.

8 Claims, 22 Drawing Sheets

(56) References Cited

U.S. PATENT DOCUMENTS

| | | | |
|---|---|---|---|
| 2,825,528 A | 3/1958 | Truitt | |
| 3,000,608 A | 9/1961 | Williams | |
| 3,111,091 A | 11/1963 | Hopkinson | |
| 3,190,305 A | 6/1965 | Schulze | |
| 3,586,104 A | 6/1971 | Hyde et al. | |
| 3,906,992 A | 9/1975 | Leach | |
| 4,009,727 A | 3/1977 | Bailey | |
| 4,234,008 A | 11/1980 | Cronfel | |
| 4,354,663 A | 10/1982 | Vanderburg et al. | |
| 4,377,274 A | 3/1983 | Mayhew, Jr. | |
| 4,483,514 A | 11/1984 | Kennedy | |
| 4,500,119 A * | 2/1985 | Geberth, Jr. | F16L 27/0828 285/276 |
| 4,512,363 A | 4/1985 | Jandrasi et al. | |
| 5,101,849 A | 4/1992 | Richard | |
| 5,280,806 A | 1/1994 | Glazebrook | |
| 5,330,158 A | 7/1994 | Ellich et al. | |
| 5,449,146 A | 9/1995 | Weagraff | |
| 5,464,035 A | 11/1995 | Heinecke | |
| 5,653,423 A | 8/1997 | Young et al. | |
| 5,716,080 A * | 2/1998 | Kaleniecki | F16L 27/00 285/279 |
| 5,718,458 A * | 2/1998 | Erstad | F16L 39/06 285/96 |
| 5,890,700 A | 4/1999 | Clarkson et al. | |
| 5,895,028 A | 4/1999 | Varady | |
| 5,938,175 A | 8/1999 | Young et al. | |
| 6,145,544 A | 11/2000 | Dutertre et al. | |
| 6,293,306 B1 | 9/2001 | Brenes | |
| 6,311,949 B1 | 11/2001 | Iida et al. | |
| 6,354,637 B1 * | 3/2002 | Coronado | F16L 25/14 285/357 |
| 6,446,664 B1 | 9/2002 | Parsons | |
| 6,637,457 B2 | 10/2003 | Evanovich et al. | |
| 6,745,999 B1 | 6/2004 | Heinecke et al. | |
| 7,028,984 B2 | 4/2006 | Wang | |
| 7,337,796 B2 * | 3/2008 | Choate | F16K 17/04 137/15.19 |
| 7,431,264 B2 | 10/2008 | Leroux | |
| 8,132,961 B1 | 3/2012 | England et al. | |
| 8,312,931 B2 | 11/2012 | Xu et al. | |
| 9,651,186 B2 | 5/2017 | Ahuja et al. | |
| 10,145,501 B2 | 12/2018 | Fisher | |
| 2008/0035326 A1 * | 2/2008 | Cherewyk | E21B 33/068 166/75.13 |
| 2009/0236554 A1 | 9/2009 | Gifford et al. | |
| 2013/0025719 A1 | 1/2013 | Yang | |
| 2014/0154107 A1 | 6/2014 | Chatfield et al. | |
| 2015/0096641 A1 | 4/2015 | Chow et al. | |
| 2015/0354711 A1 | 12/2015 | Palomeque | |
| 2016/0017903 A1 | 1/2016 | Abe | |
| 2016/0063143 A1 | 3/2016 | Lawson et al. | |
| 2017/0023034 A1 | 1/2017 | Kerr | |
| 2017/0370385 A1 | 12/2017 | Reckner et al. | |
| 2018/0202559 A1 | 7/2018 | Freeman, III | |

FOREIGN PATENT DOCUMENTS

| | | |
|---|---|---|
| FR | 2845129 B1 | 4/2006 |
| KR | 20160081045 A1 | 7/2016 |

OTHER PUBLICATIONS

Definition of "pipeline". Printed Oct. 2021.*
"GS Sliding Gate Control Valves," <http://www.bvalve.es> [retrieved Jun. 10, 2019], 1 page.
"Stainless Steel Lined Resilient Seated Knife Gate Valve," <http://www.fnw.com> [retrieved Mar. 18, 2019], 4 pages.
"Options for Uni-Directional Knife Gate Valves," <http://www.vaasval.com> at least as early as Aug. 2011, 12 pages.
Monsen, J., "Liquid Flow in Control Valves—Choked Flow, Cavitation and Flashing," <http://www.valin.com> [retrieved Jan. 30, 2017], 8 pages.
"Fabri-Valve—Slide Gate Valve—Figure F 39," ITT Industries, Federal Way, Wash., 2004, 4 page pamphlet.
Dezurik, "SPX Valves & Controls," Bulletin of the SPX Valves and Controls, Minnesota Bulletin 37.00-2:1-4, May 2001.

* cited by examiner

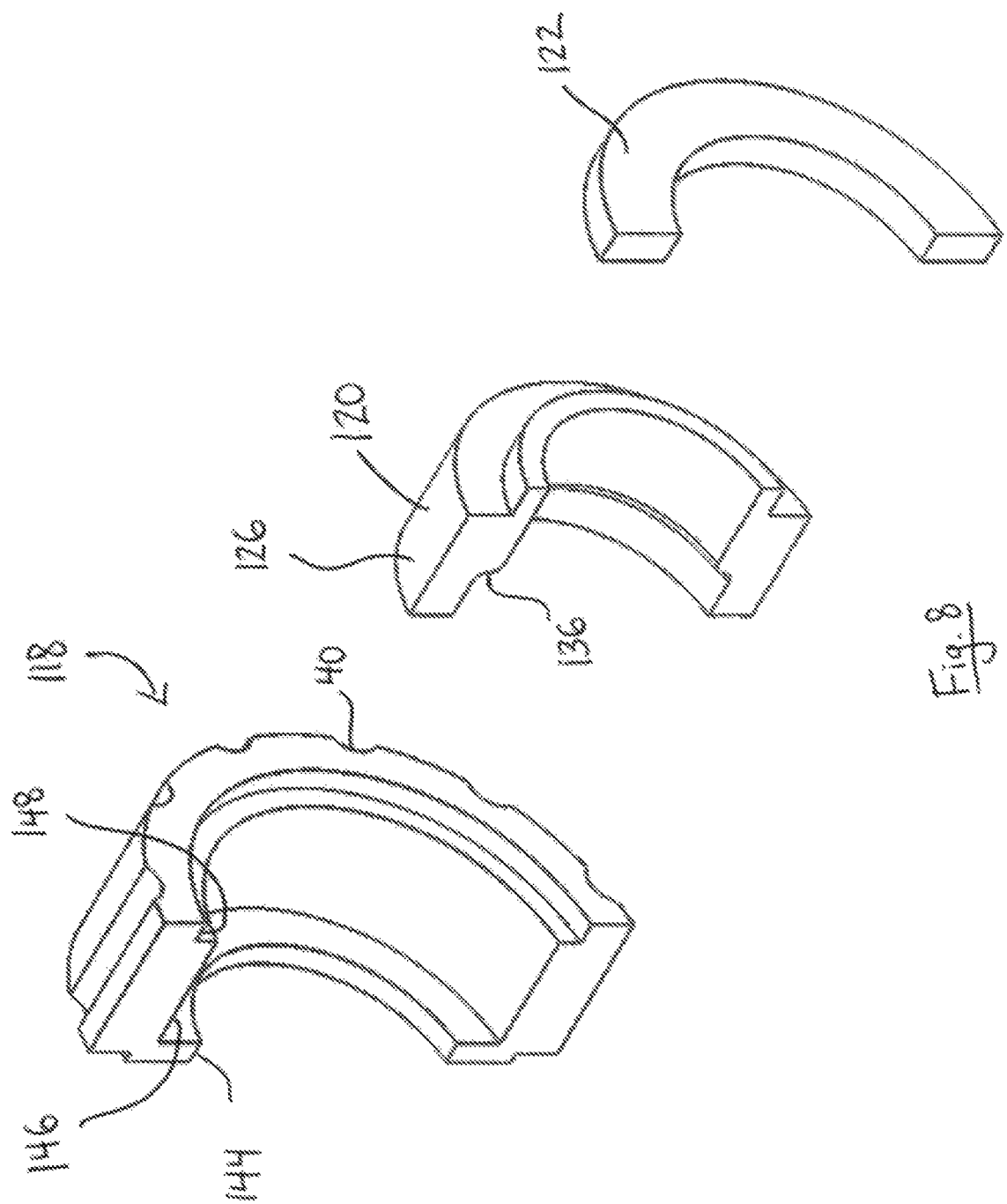

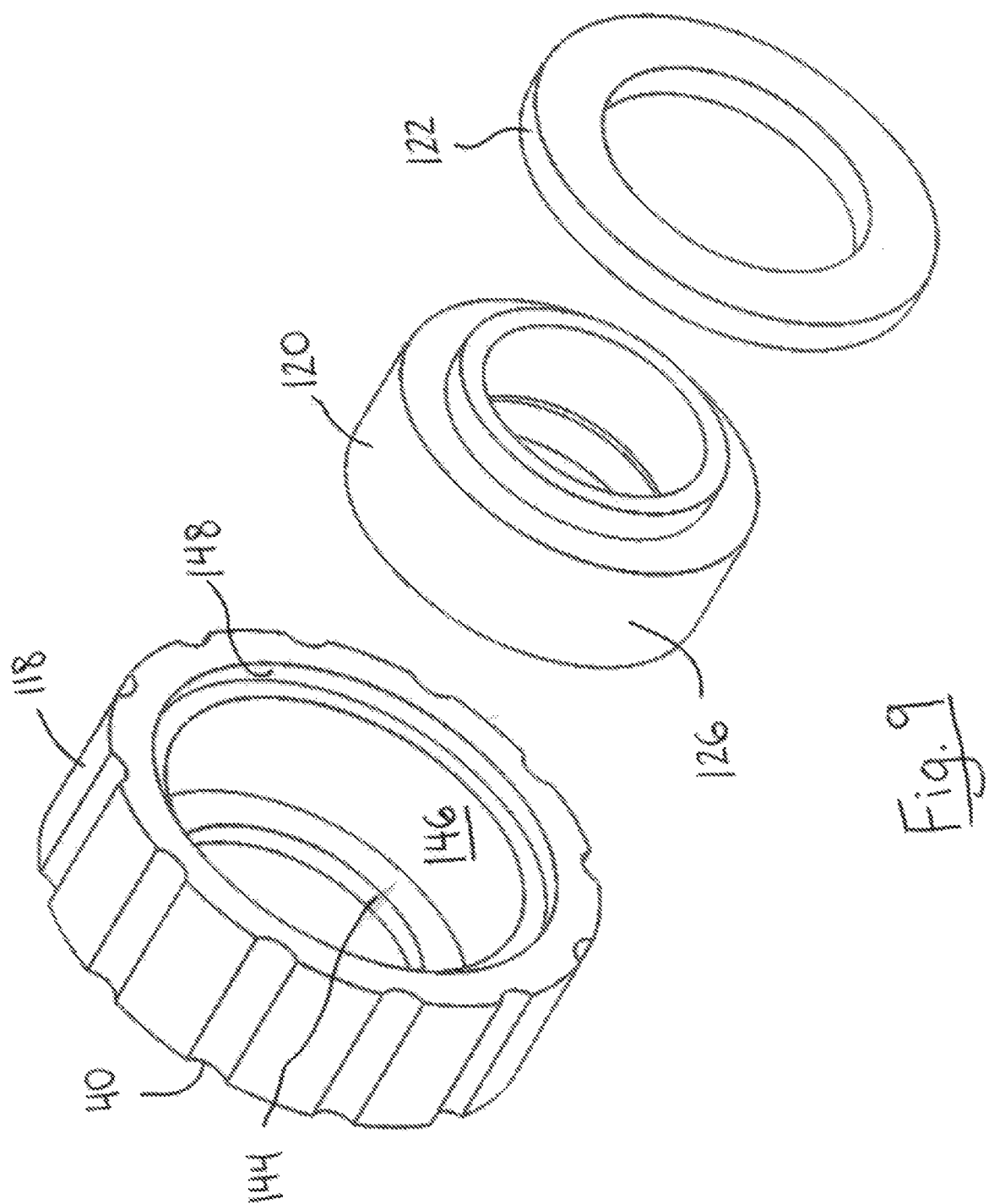

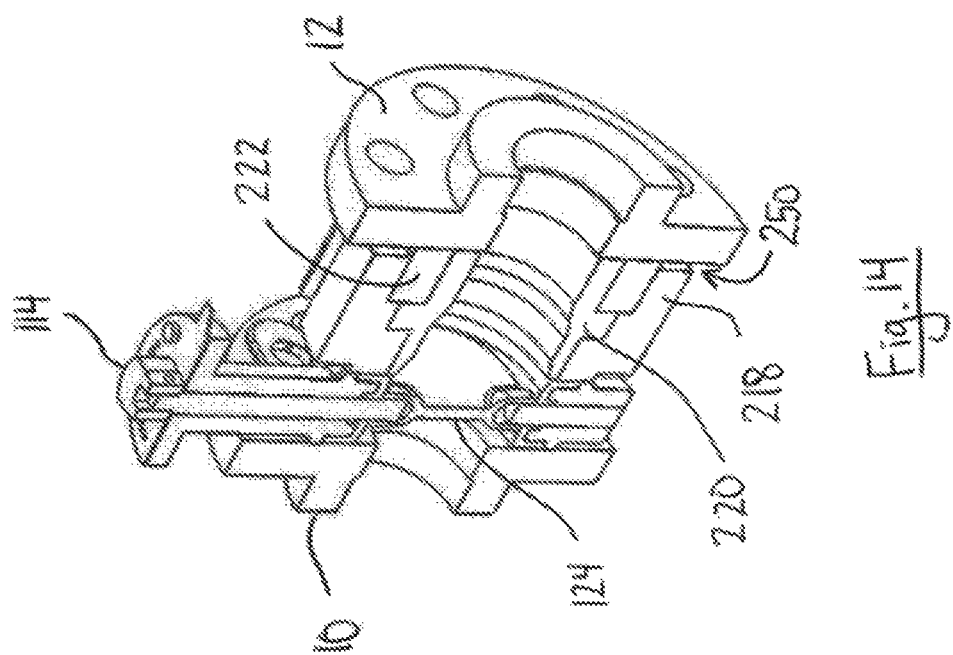
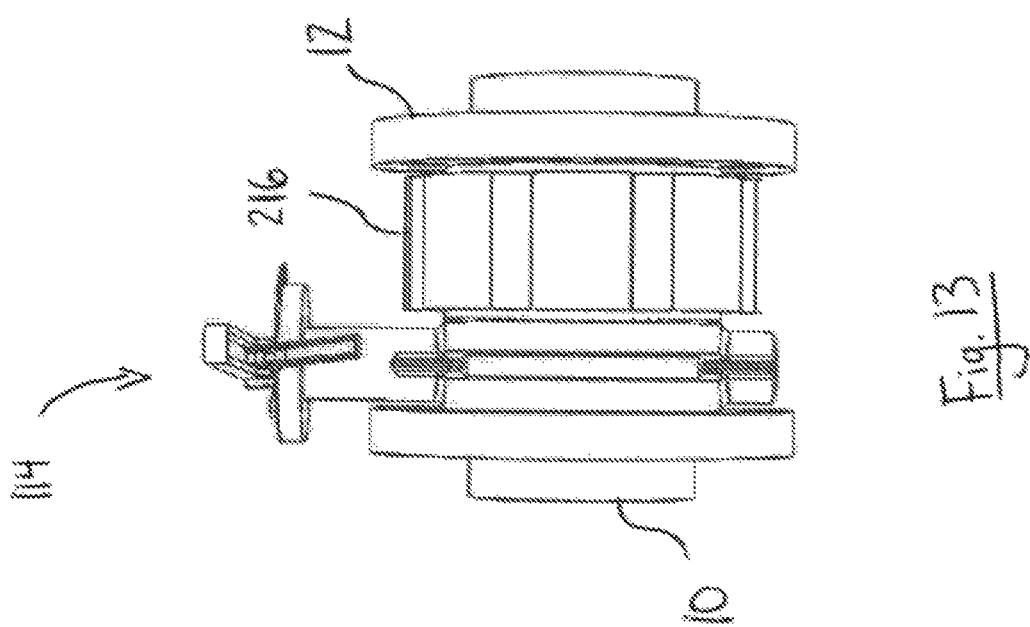

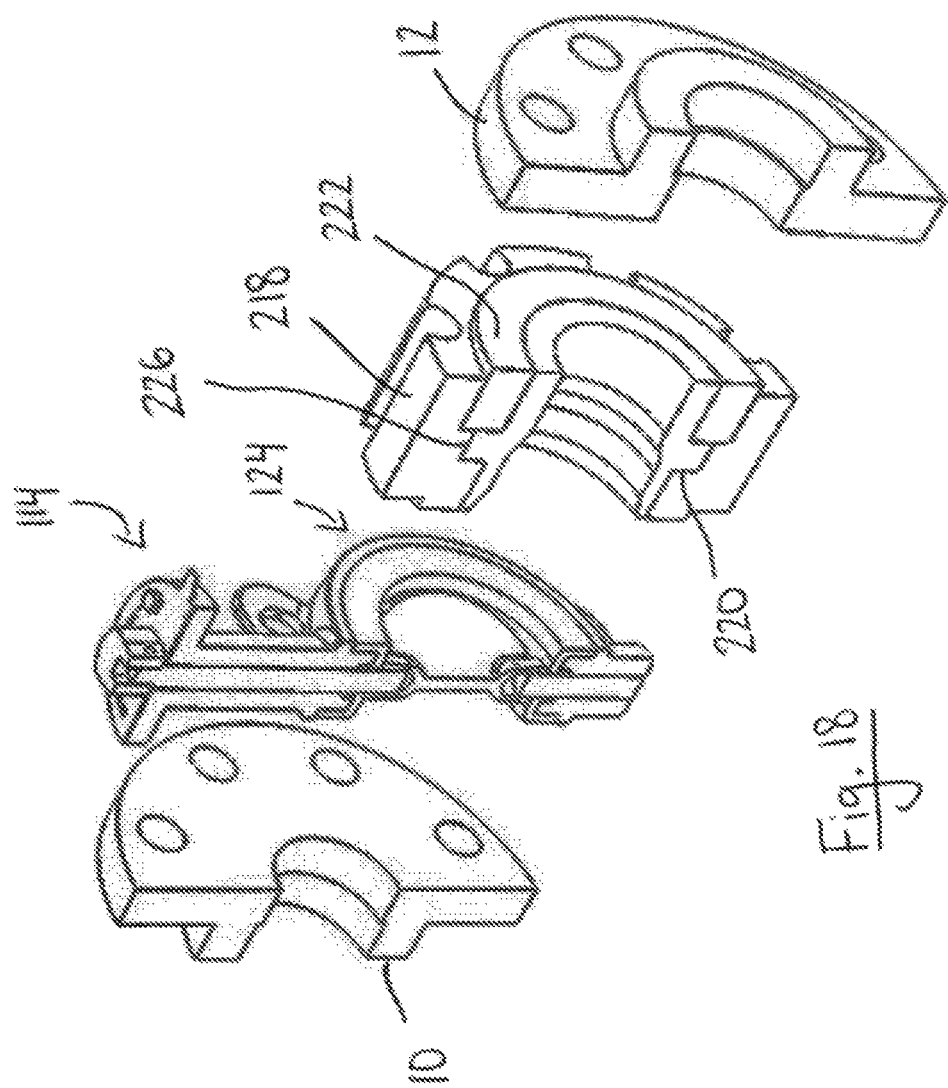

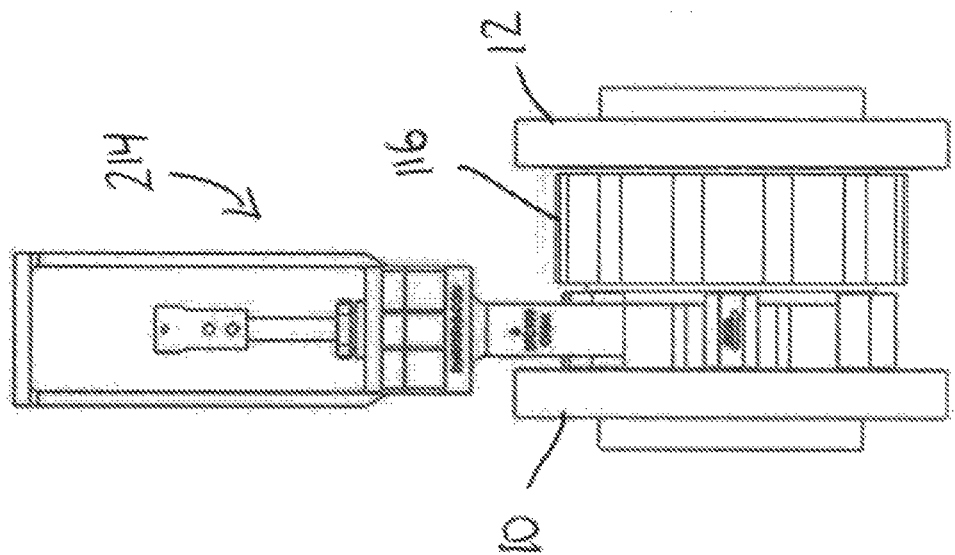
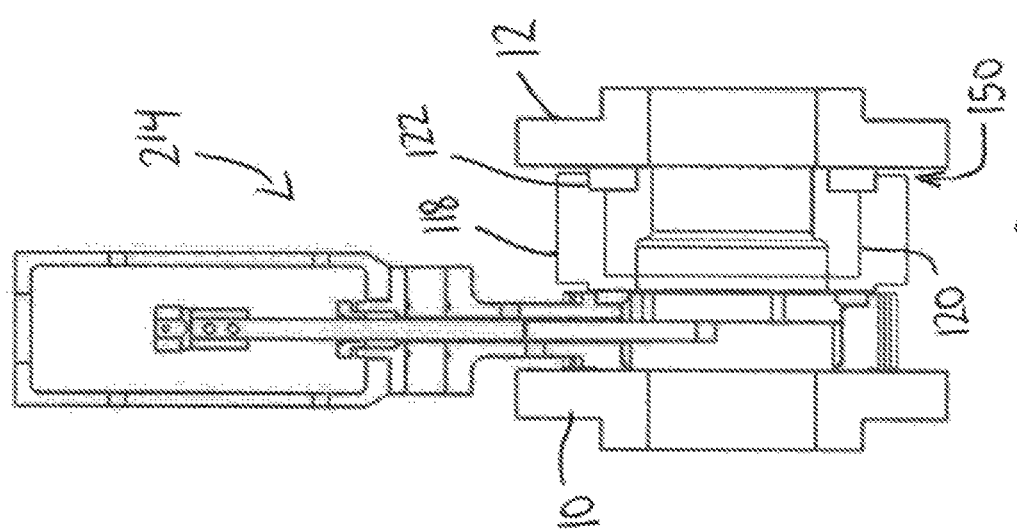

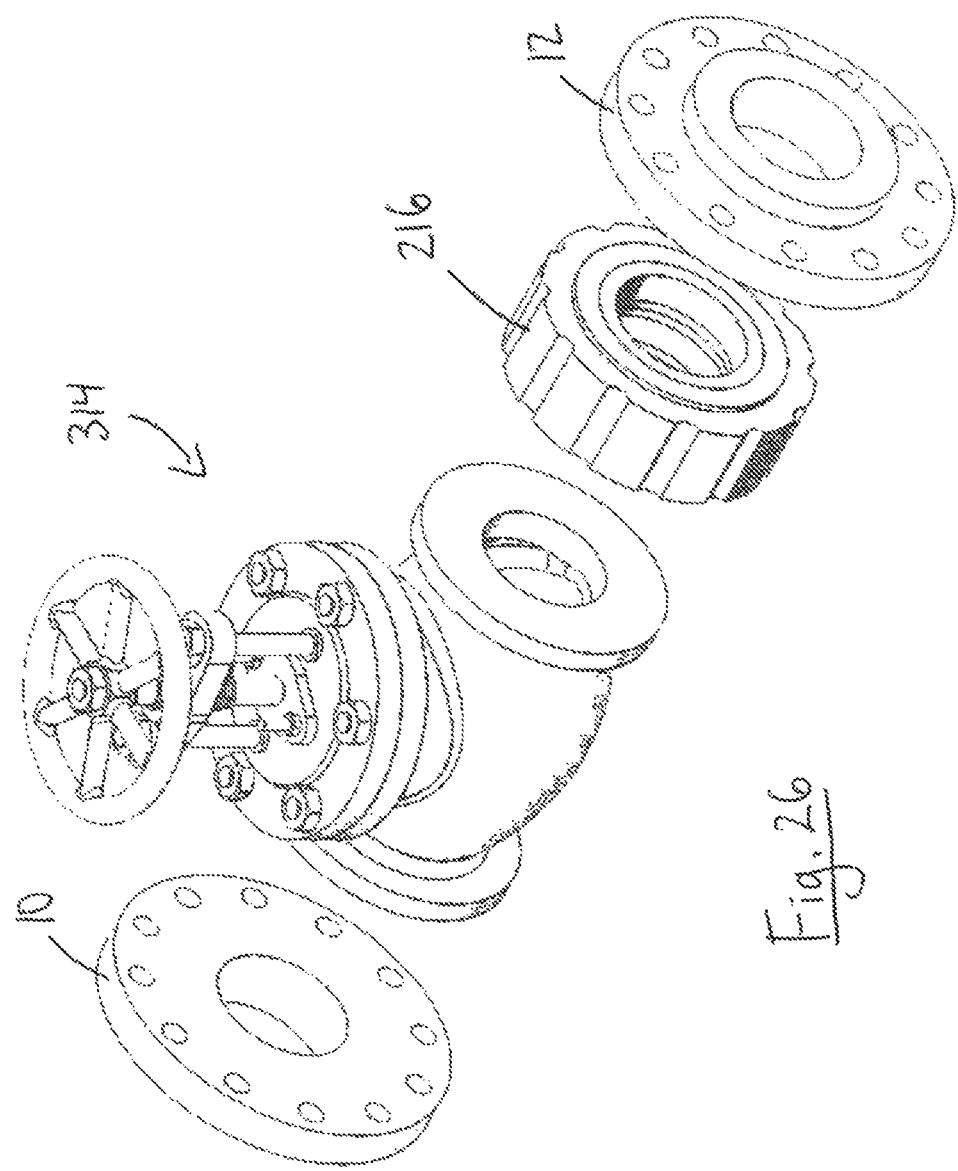

FLOW CENTRALIZER FOR VALVE ASSEMBLY

TECHNICAL FIELD

This relates to a flow centralizer for use with a valve assembly.

BACKGROUND

Flow control valves may be used in various applications, such as: mine tailings, flotation, process water, dry bulk, cyclone, hoppers, thickener, solvent flashing, hydro transport, filter press, oil sands and high pressure gas service. Flow control valves may deflect flow as fluids pass through the valve when it is in an open or partially open position. Flow deflection can have a detrimental effect on the integrity of the pipes downstream of the valve by causing erosion damage to pipe walls.

SUMMARY

In one embodiment there is disclosed a valve assembly including a flow control valve and a flow centralizer. The flow centralizer has a flowthrough bore. The flow centralizer is downstream of the flow control valve. The flowthrough bore narrows in a direction downstream of the flow control valve.

In another embodiment there is disclosed a flow centralizer for use with a valve assembly. The flow centralizer has an orifice body defining a bore having a minimum diameter. An insert defines a flowthrough bore extending between a narrow end and wide end of the flowthrough bore. The flowthrough bore has a smaller diameter at the narrow end. The insert has an insert flange that defines a maximum external diameter. A flange ring has a minimum internal diameter. The minimum diameter of the bore of the orifice body and the minimum internal diameter of the flange ring are each smaller than the maximum external diameter of the insert flange so that the insert flange is held in position between the flange ring and the orifice body when the flow centralizer is in use.

In various embodiments, there may be included one or more of the following features: the flow centralizer is adjacent to the flow control valve; the flow centralizer further comprises an insert, and the insert comprises the flowthrough bore; the insert further comprises tungsten carbide; the flow control valve is a gate valve; the flowthrough bore further comprises a plurality of bores defining diameters, each of the bores having diameters that are smaller in size in the direction downstream of the flow control valve; an orifice body defines a bore having a minimum diameter; a flange ring defines a minimum internal diameter; the insert further comprises an insert flange defining a maximum external diameter; the minimum diameter of the bore of the orifice body and the minimum internal diameter of the flange ring are each smaller than the maximum external diameter of the insert flange so that the insert flange is held in position between the flange ring and the orifice body when the flow centralizer is in use; the flange ring sits within the bore of the orifice body when the flow centralizer is in use; the flow centralizer is integral with the valve body; and the orifice body is integral with the valve body.

The foregoing summary is not intended to summarize each potential embodiment or every aspect of the subject matter of the present disclosure.

These and other aspects of the device and method are set out in the claims.

BRIEF DESCRIPTION OF THE FIGURES

Embodiments will now be described with reference to the figures, in which like reference characters denote like elements, by way of example, and in which:

FIG. 8 is an isometric exploded section view of another embodiment of a flow centralizer with an orifice body, an insert and a flange ring.

FIG. 9 is an isometric exploded view of the flow centralizer of FIG. 8.

FIG. 13 is a front view of another embodiment of a flow centralizer and a butterfly valve assembly.

FIG. 14 is an isometric section assembly view of the flow centralizer and valve assembly of FIG. 13.

FIG. 18 is an exploded isometric section view of the flow centralizer and valve assembly of FIG. 13.

FIG. 19 is a front section view of another embodiment of a flow centralizer and gate valve assembly.

FIG. 20 is a front view of the flow centralizer and valve assembly of FIG. 19.

FIG. 26 is an exploded isometric view of the flow centralizer and the valve assembly of FIG. 25.

DETAILED DESCRIPTION

Figure 1:
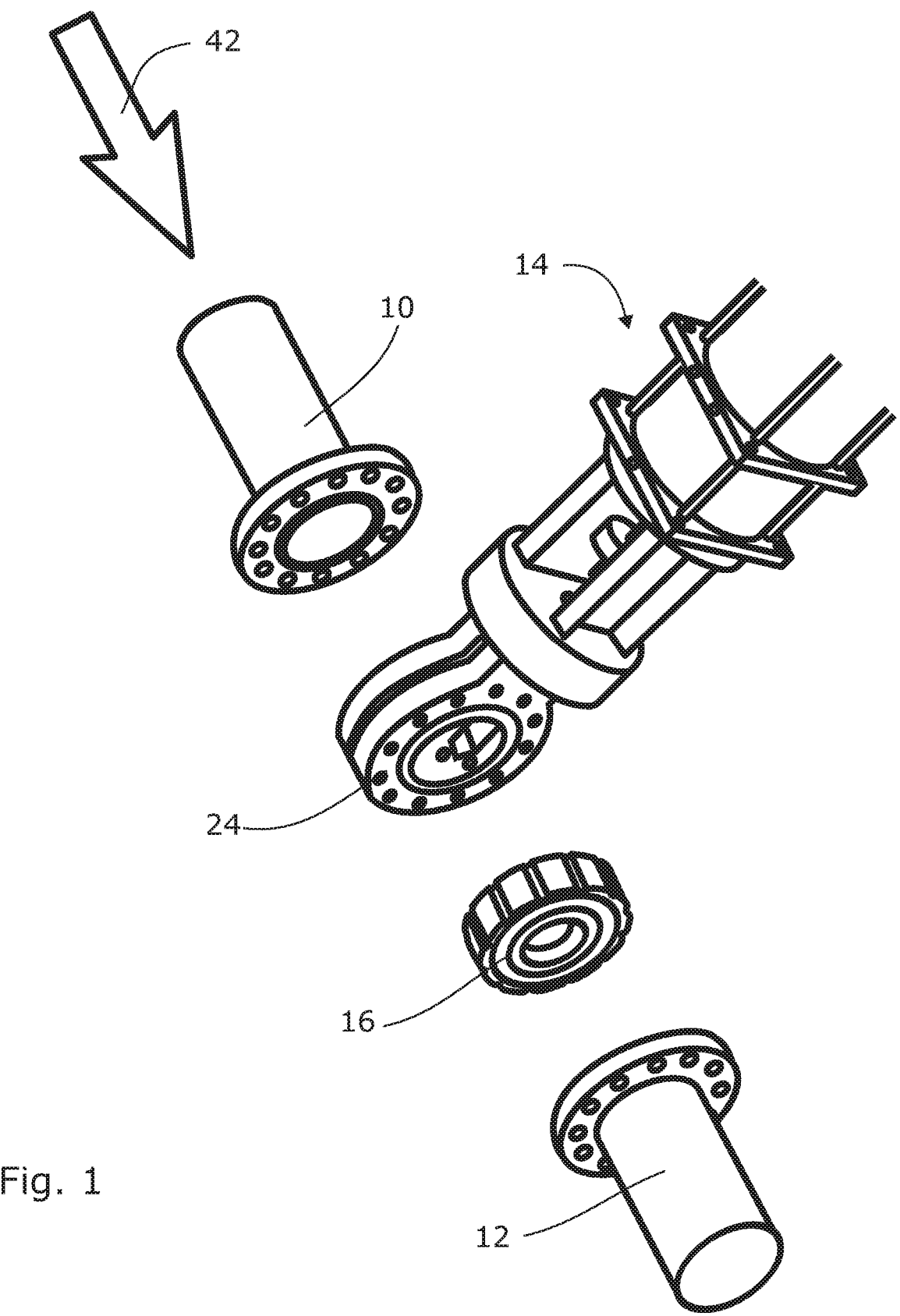
FIG. 1 is an exploded perspective view of a flow centralizer and valve assembly.
Figure 2:
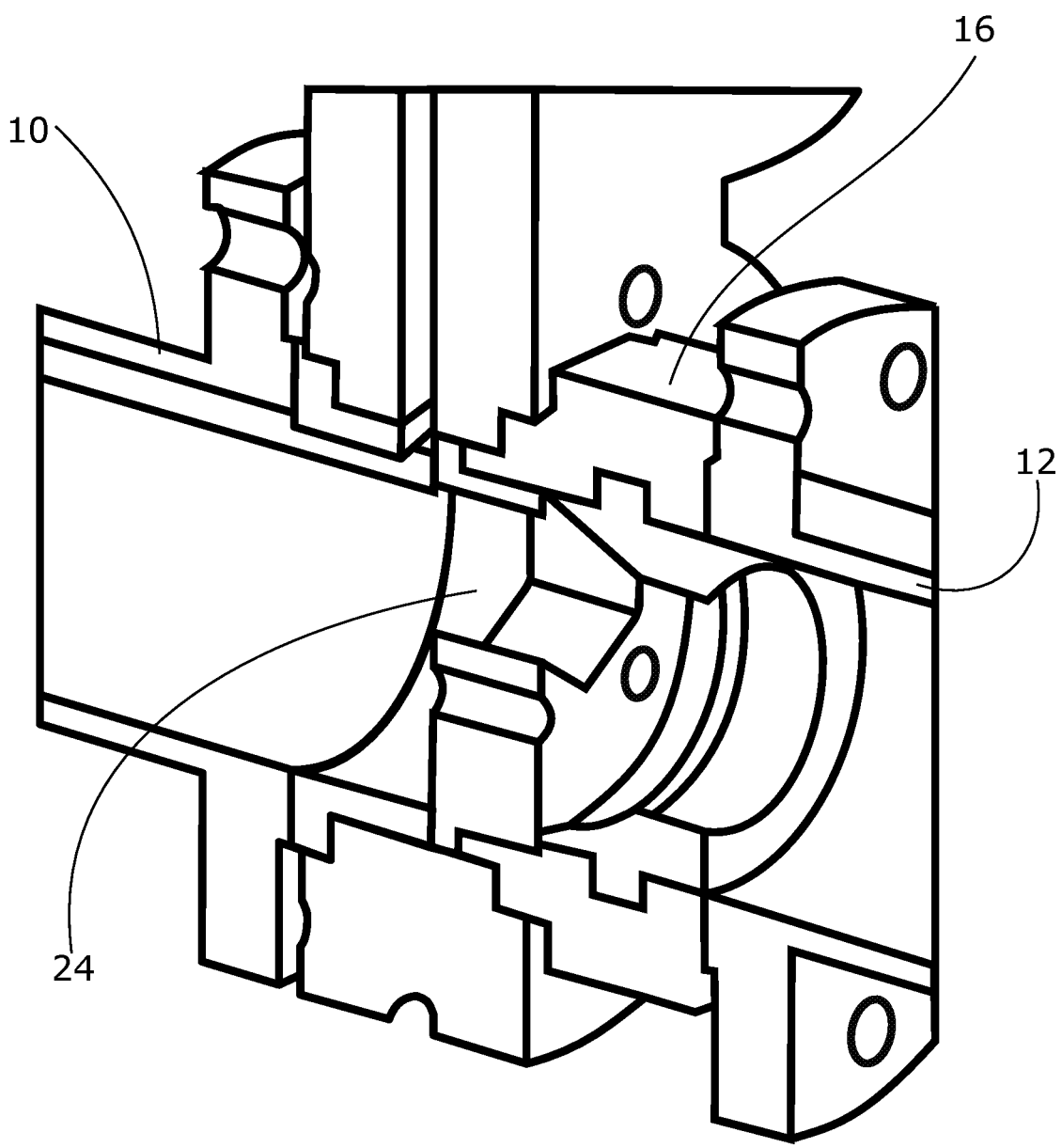
FIG. 2 is a cutaway perspective view of a flow centralizer adjacent to a valve assembly.
Figure 3:
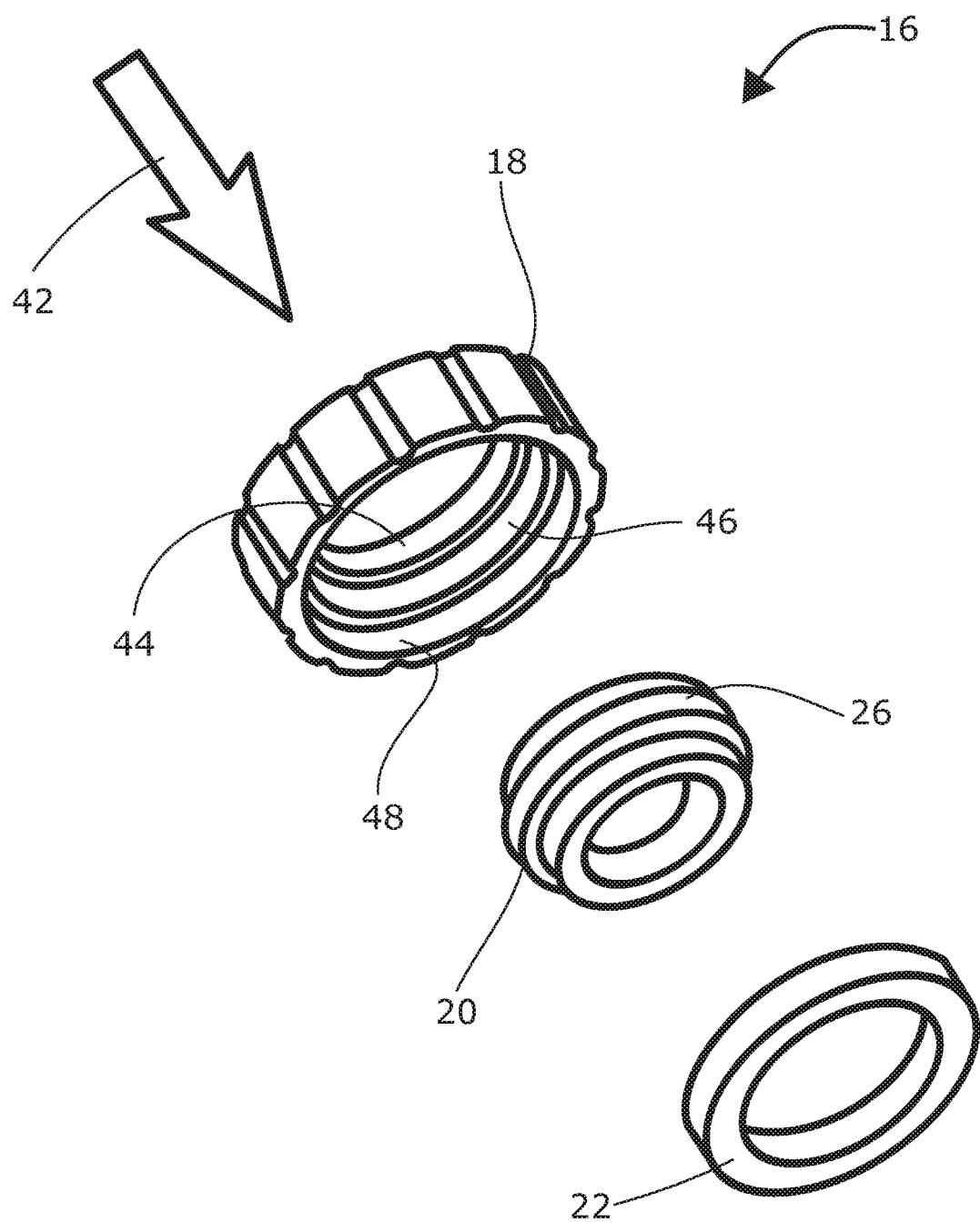
FIG. 3 is an exploded view of a flow centralizer with an orifice body, an insert and a flange ring.
Figure 4:
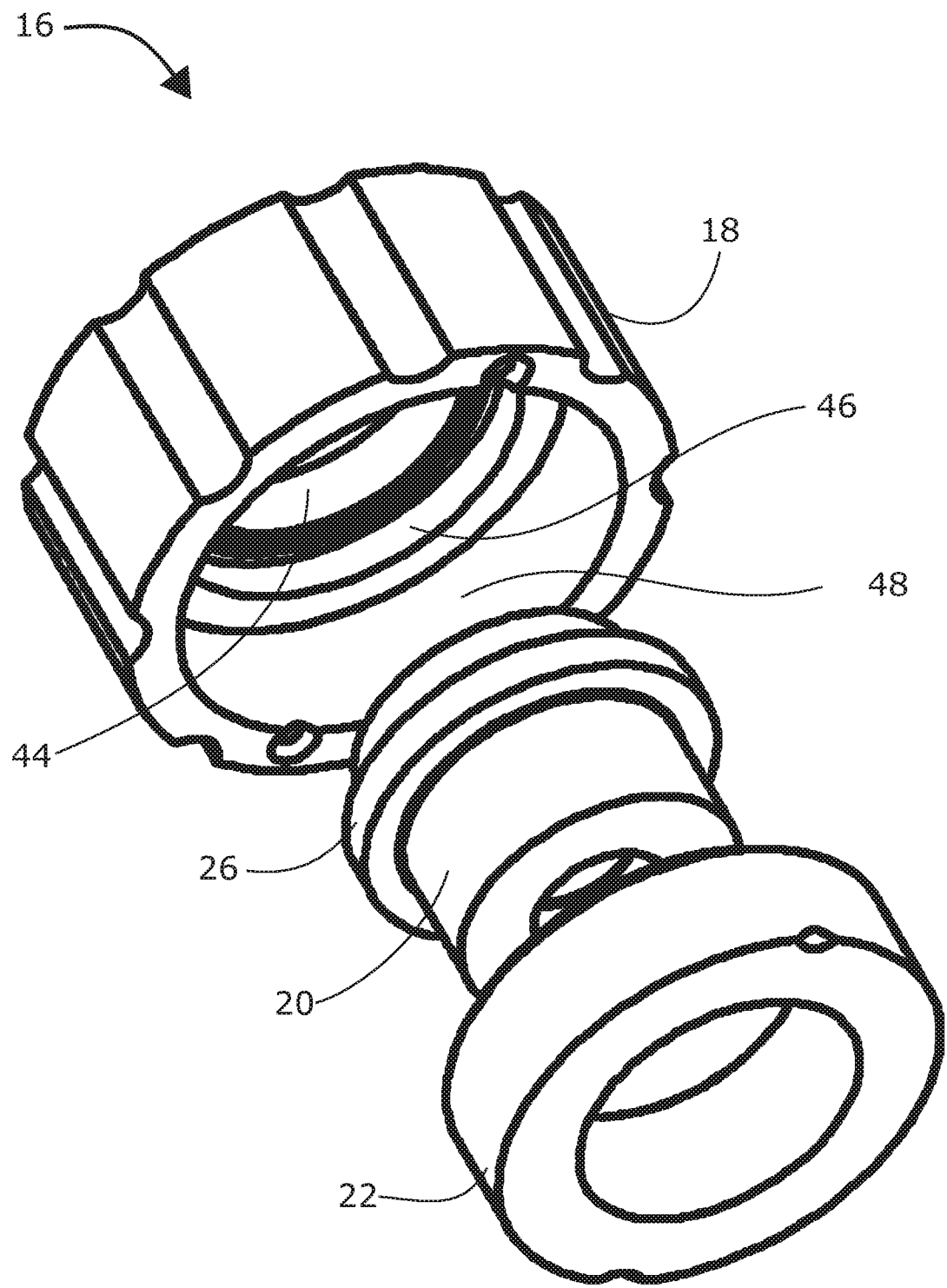
FIG. 4 is an exploded isometric view of a flow centralizer.
Figure 5:
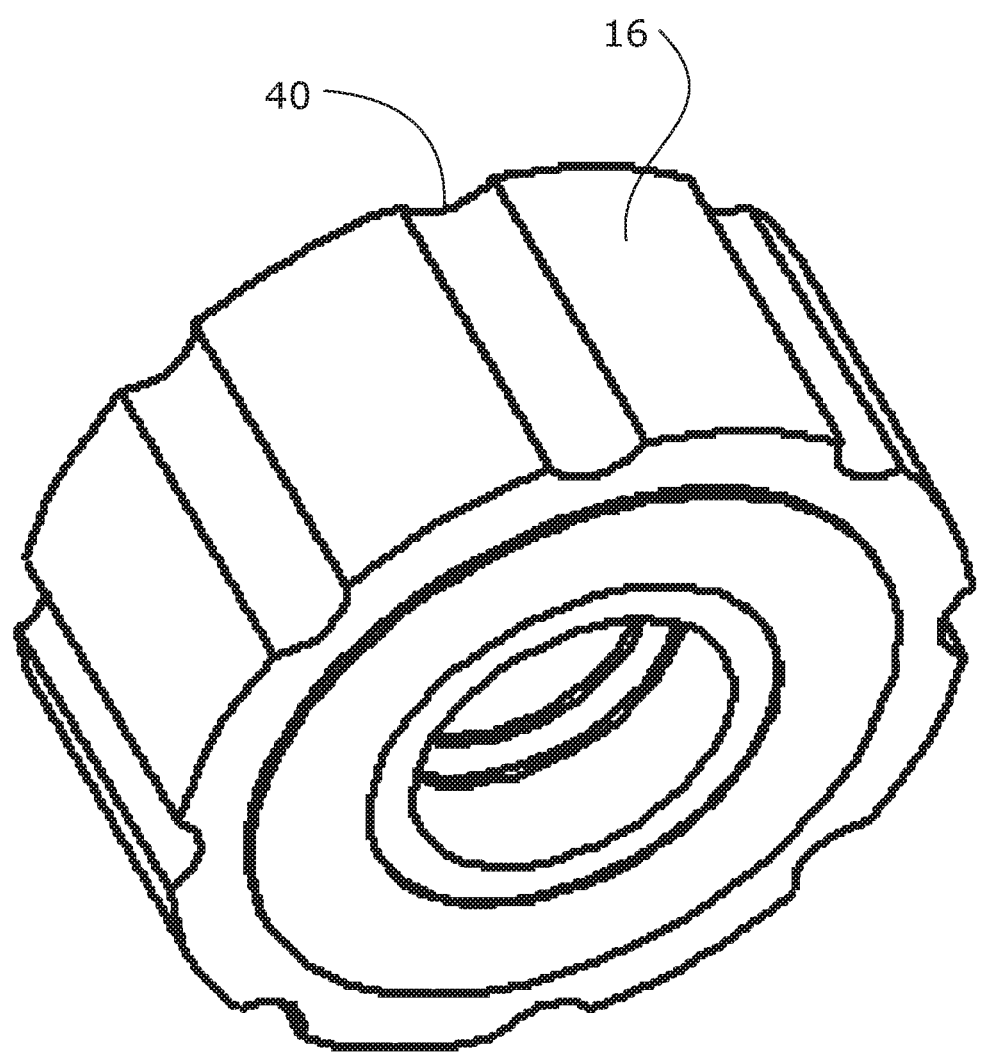
FIG. 5 is an isometric view of a flow centralizer.

FIGS. 1 and 2 show a valve assembly including flow centralizer or wear spool 16, and a flow control valve 14 having a valve body 24. The terms flow centralizer and wear spool are used interchangeably herein.

The valve assembly in FIGS. 1 and 2 is connected to an inlet pipe through an inlet pipe spool 10 and an outlet pipe through an outlet pipe spool 12. The flow centralizer 16 and valve body 24 are adjacent each other between the inlet pipe spool 10 and the outlet pipe spool 12. The valve body 24 in this embodiment is a gate valve. In other embodiments, other types of valves may be used. The flow centralizer may have particular application with valves which are not centered when in a partially open position.

Figure 6:
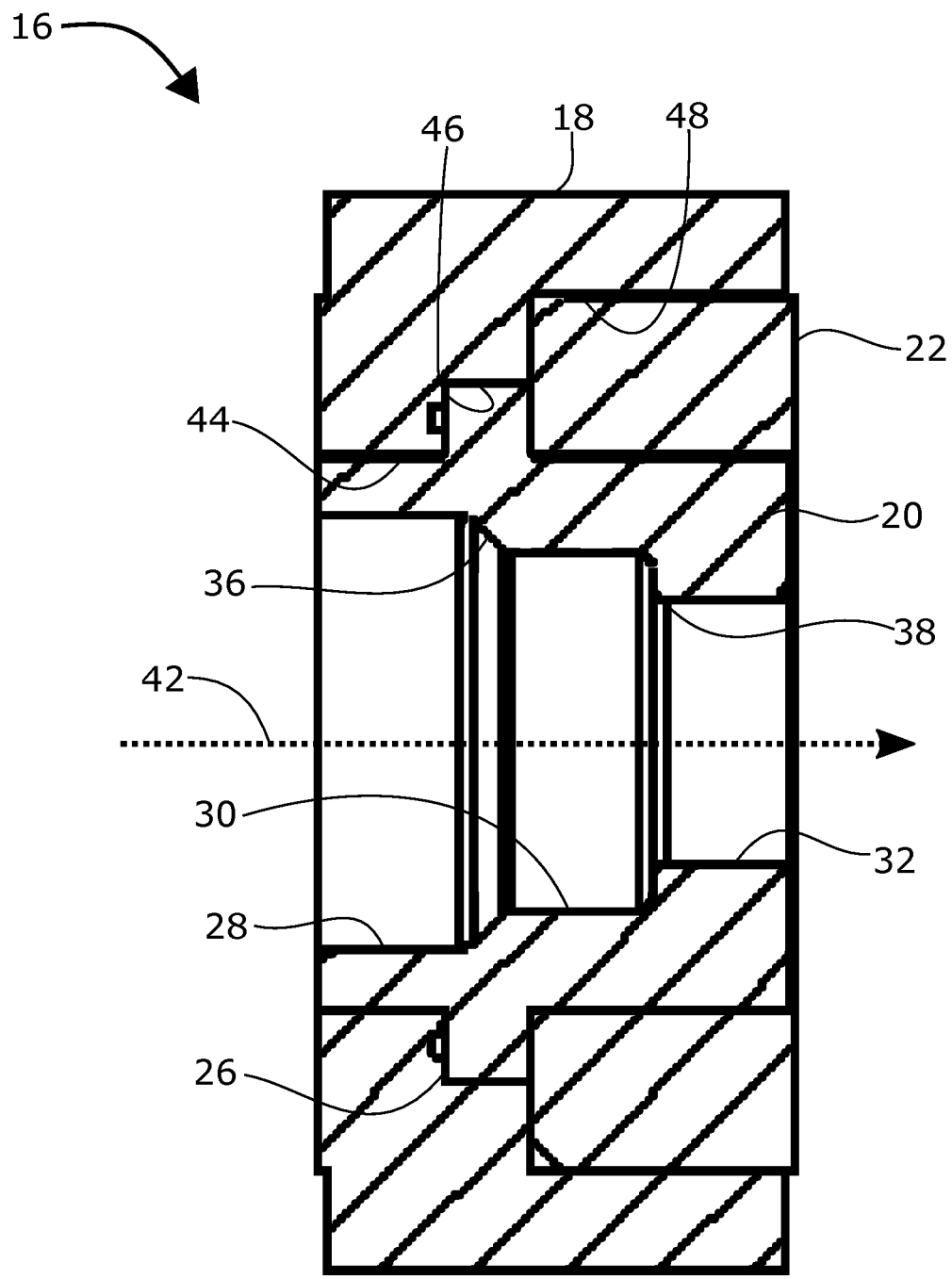
FIG. 6 is a cross-section view of the flow centralizer of FIG. 5, through the line A-A in FIG. 7.
Figure 7:
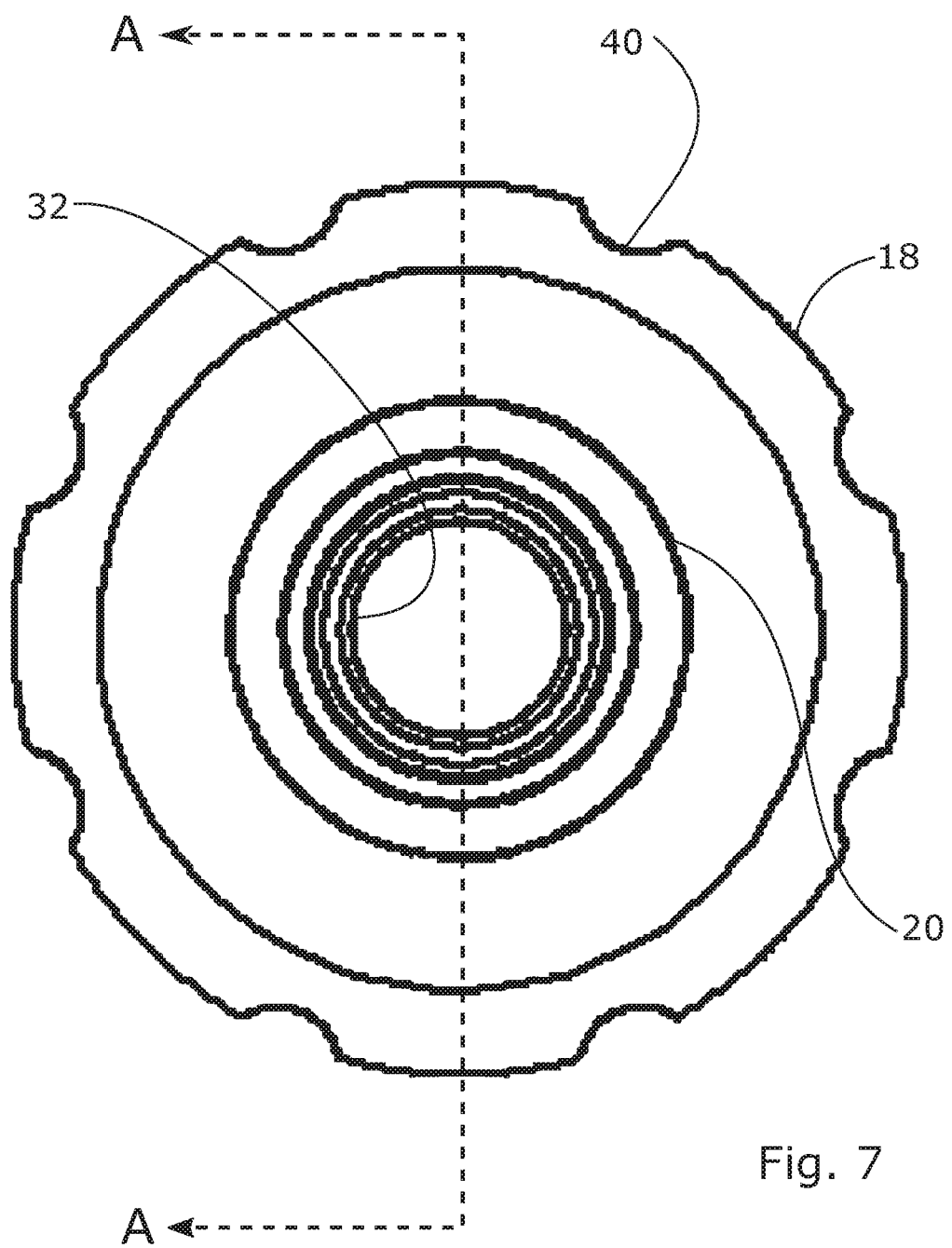
FIG. 7 is a back view of the flow centralizer of FIG. 5.
Figure 12:
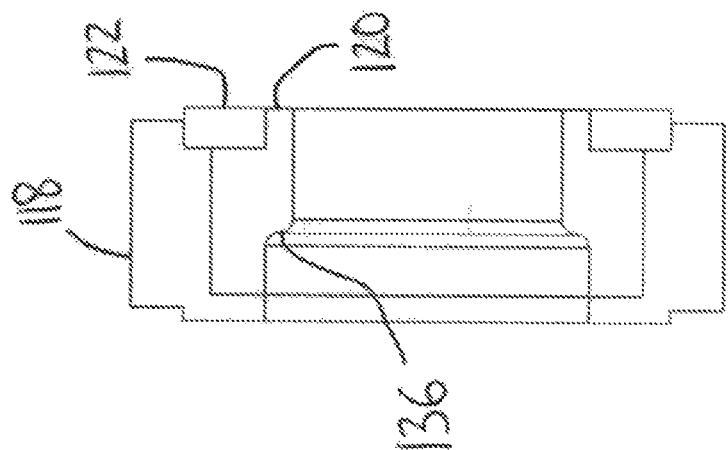
FIG. 12 is a front section view of the flow centralizer of FIG. 8.
Figure 11:
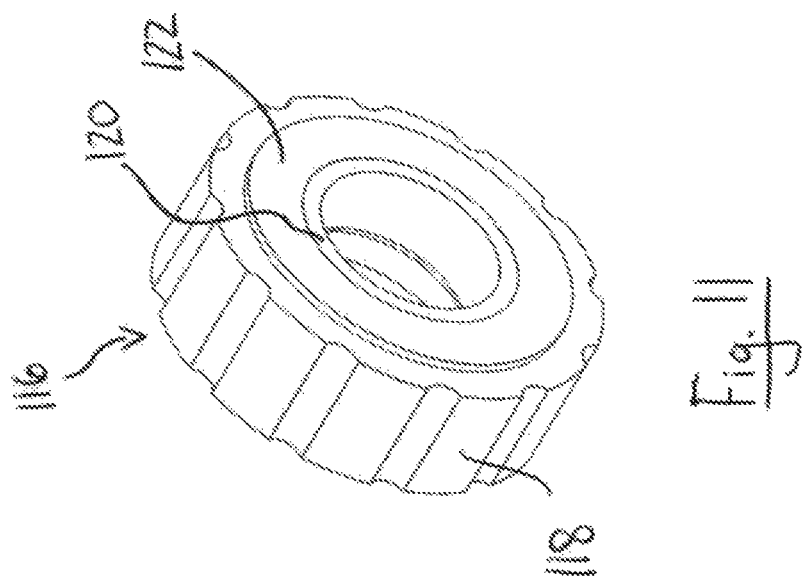
FIG. 11 is an isometric view of the flow centralizer of FIG. 8.
Figure 10:
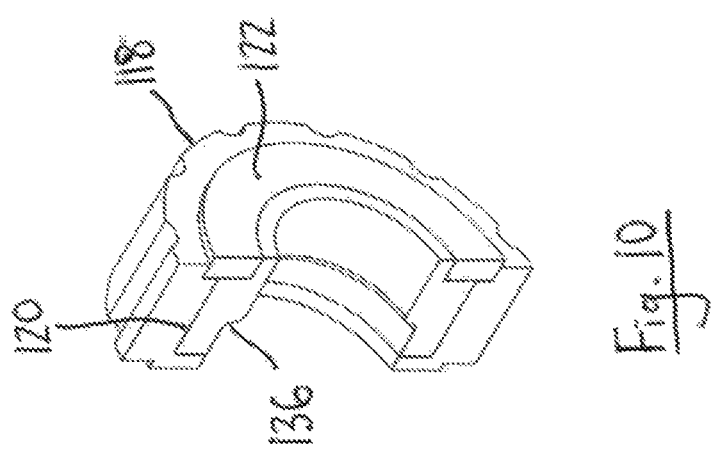
FIG. 10 is an isometric section view of the flow centralizer of FIG. 8.
Figure 16:
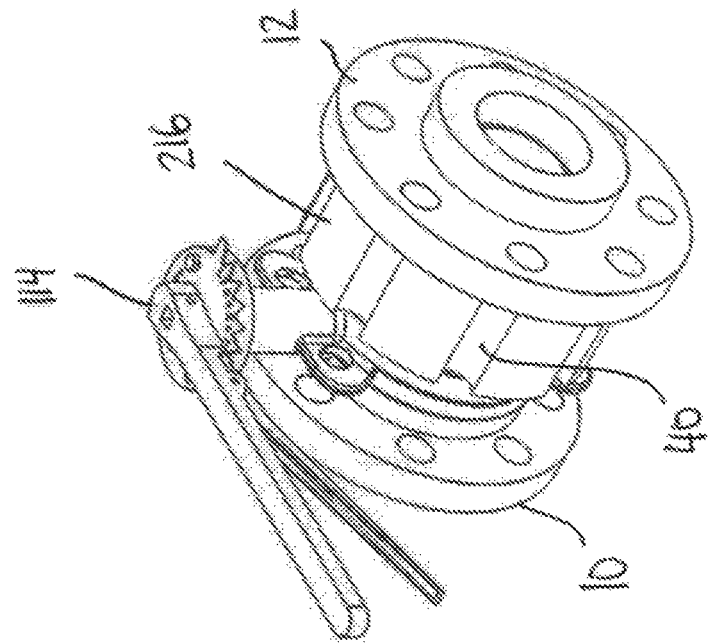
FIG. 16 is an isometric view of the flow centralizer and valve assembly of FIG. 13.

As shown in FIGS. 3 to 7, the flow centralizer 16 has an insert 20 having a flowthrough bore which is formed from a plurality of bores 28, 30, 32 in the insert 20. The flow centralizer 16 is downstream of the flow control valve 14 as shown by the flow direction represented by the arrow 42. The flowthrough bore narrows in a direction downstream of the flow control valve, with each of the diameters of the bores 28, 30, 32 being smaller in size in the direction downstream of the flow control valve 14. As shown in FIG. 6, a sloped surface 36 connects between bore 28 and bore 30, whereas a perpendicular surface 38 connects between bore 30 and bore 32. Various different designs and shapes of flowthrough bores may be used, including, for example, those shown in the embodiments in FIGS. 8 to 12.

The flow centralizer 16 may be formed from three components: the insert 20, an orifice body 18 and a flange ring 22. The orifice body 18 acts as a housing for the flange ring 22 and the insert 20. The orifice body 18 includes an internal bore made up of three bore segments 44, 46, 48. The segment 44 has the smallest diameter of the bores in the orifice body and defines a minimum diameter of the orifice body 18. The insert 20 is held in position between portions of the orifice body 18 and the flange ring 22.

The flowthrough bore of the insert 20 extends between a narrow end of the flowthrough bore adjacent to the bore 32 and a wide end of the flowthrough bore adjacent to the bore 28. The flowthrough bore has a smaller diameter at the narrow end than the wide end. The insert 20 has an insert flange 26 that defines a maximum external diameter of the insert 20. The flange ring 22 has a minimum internal diameter, which in this embodiment is the internal diameter of the flange ring 22. As shown in FIG. 6, the minimum diameter of the bore of the orifice body 18 and the minimum internal diameter of the flange ring 22 are each smaller than the maximum external diameter of the insert flange 26 so that the insert flange 26 of the insert 20 is held in position between the flange ring 22 and the orifice body 18 when the flow centralizer is in use.

The orifice body 18 may include grooves 40 which match bolts connecting to the outlet pipe spool. The valve and flow centralizer are held in position by bolts connecting to the outlet pipe spool and the inlet pipe spool. The flange ring is held in position within the orifice ring by the outlet pipe spool. The flange ring in turn holds the insert in position within the orifice body.

FIGS. 8 to 12 show another embodiment of a flow centralizer 116. The flow centralizer 116 is made from the same three components as in the embodiments shown in FIGS. 3 to 7: an insert 120, an orifice body 118 and a flange ring 122. The function and design of the insert 120, the orifice body 118 and flange 122 are similar to those shown in FIGS. 3 to 7. The bores in the insert 120 and orifice body 118 have different designs than the respective bores of the insert 20 and orifice body 18 in FIGS. 3 to 7. As shown in FIG. 8, the insert 120 has a flowthrough bore which is formed from a plurality of bores, including an upstream bore and a downstream bore. The flowthrough bore in the insert 120 also narrows in a direction downstream of the flow control valve, with a sloped surface 136 connecting between the upstream and downstream bores. The insert 120 has an insert flange 126 that defines a maximum external diameter of the insert 120. In this embodiment, the insert flange 126 extends along most of the length of the insert 120. The term insert flange is used to describe the portion of the insert having the maximum external diameter of the insert. It is not restricted to having any particular dimensions or size so long as it can cooperate with the flange ring to hold the insert in position within the orifice body. The insert flange 126 in the embodiments shown in FIGS. 8 to 12 extends to the most upstream end of the insert 120, unlike the insert flange 26 as shown in the embodiments shown in FIGS. 3 to 7. At the downstream end of the insert 120, the insert flange 126 ends and is adjacent to a space that is designed to receive the flange ring 122. The orifice body 118 includes an internal bore made up of three bore segments 144, 146, 148. The segment 144 has the smallest diameter of the bores in the orifice body and defines a minimum diameter of the orifice body 118. The bore 146 extends for a longer distance along the bore of the orifice body 118 than the bore 46 in the orifice body 18 in the embodiments shown in FIGS. 3 to 7.

Figure 15:
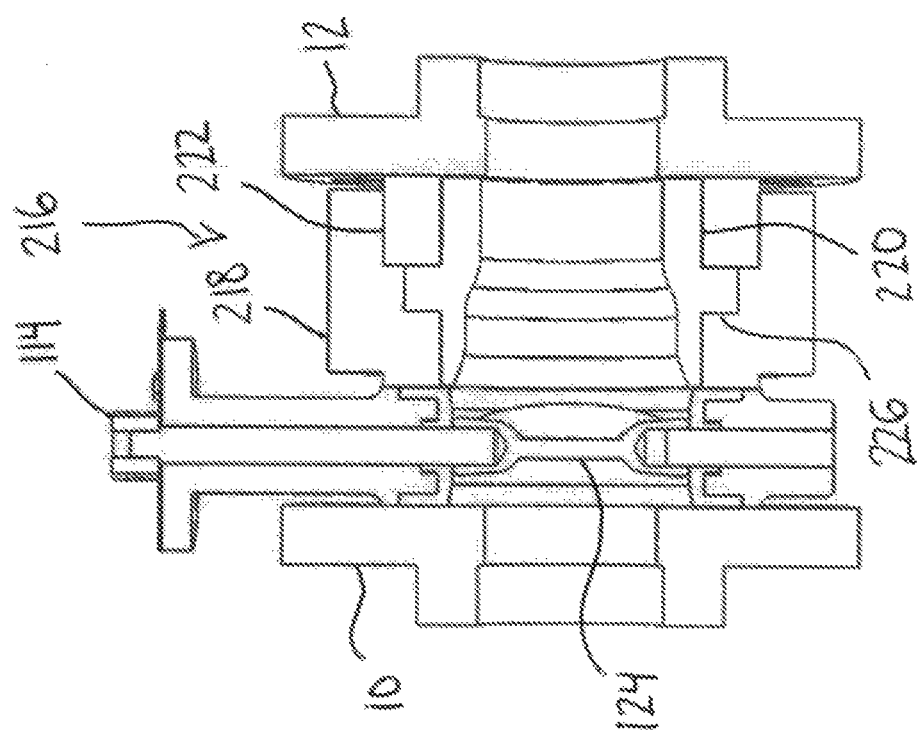
FIG. 15 is a front section view of the flow centralizer and valve assembly of FIG. 13.
Figure 17:
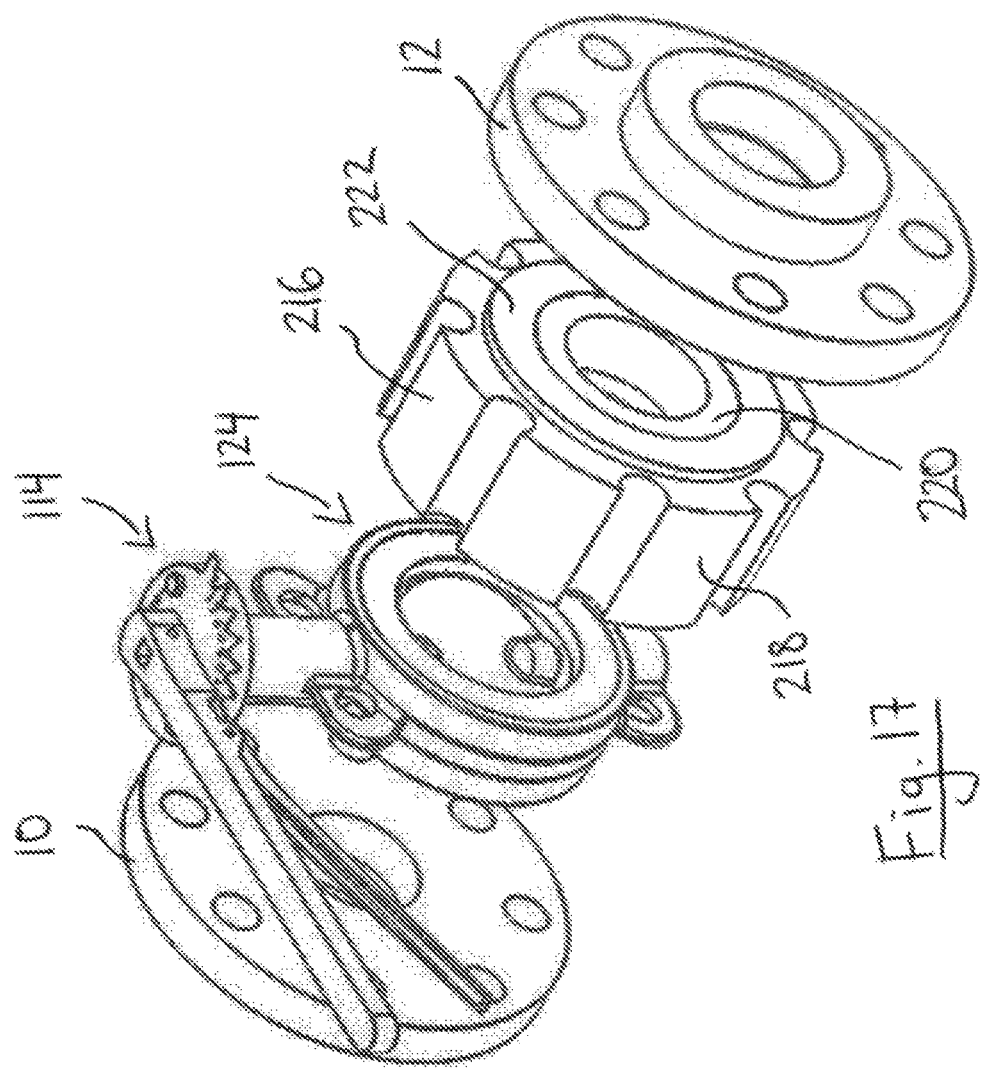
FIG. 17 is an exploded isometric view of the flow centralizer and valve assembly of FIG. 13.
Figure 22:
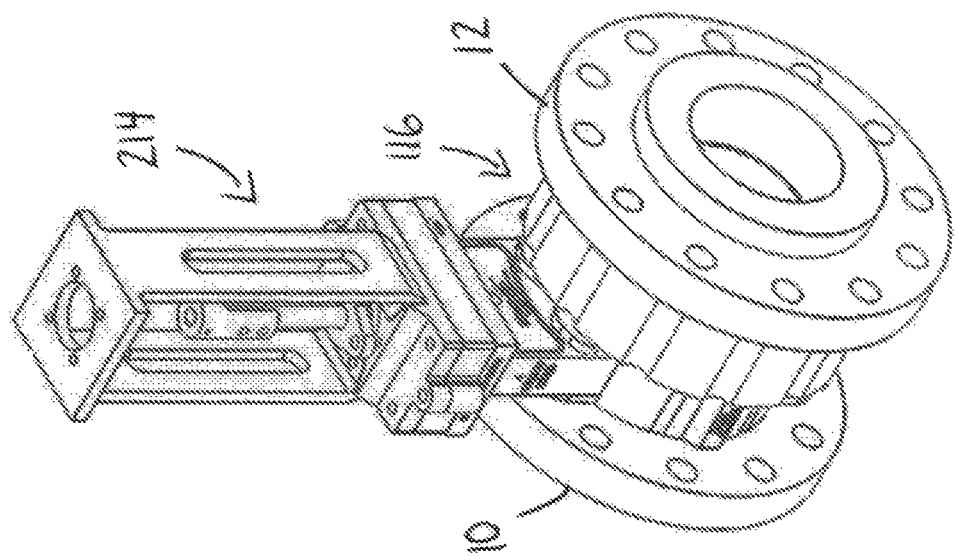
FIG. 22 is an isometric view of the flow centralizer and valve assembly of FIG. 19.
Figure 21:
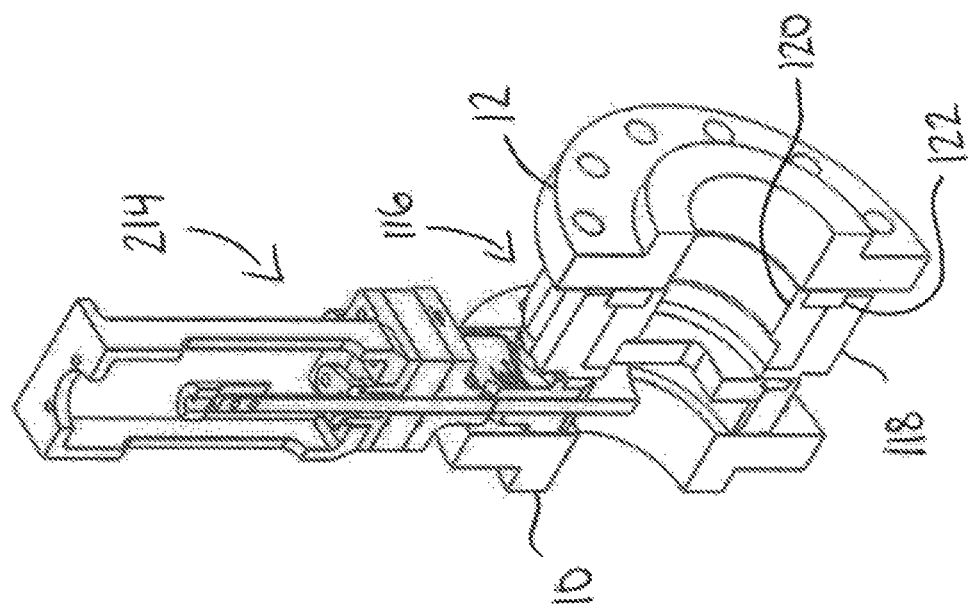
FIG. 21 is an isometric section view of the flow centralizer and valve assembly of FIG. 19.
Figure 23:
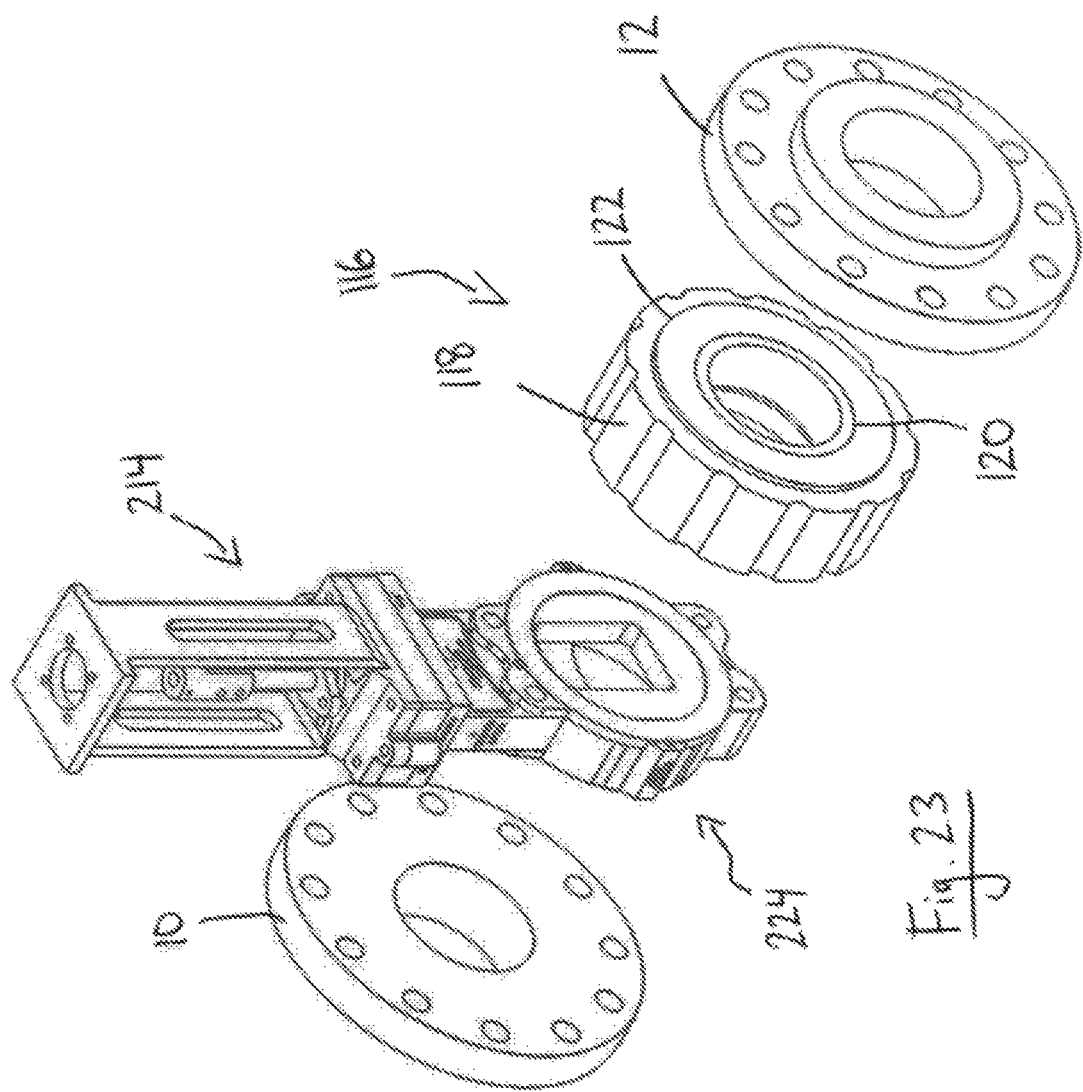
FIG. 23 is an isometric exploded view of the flow centralizer and valve assembly of FIG. 19.
Figure 24:
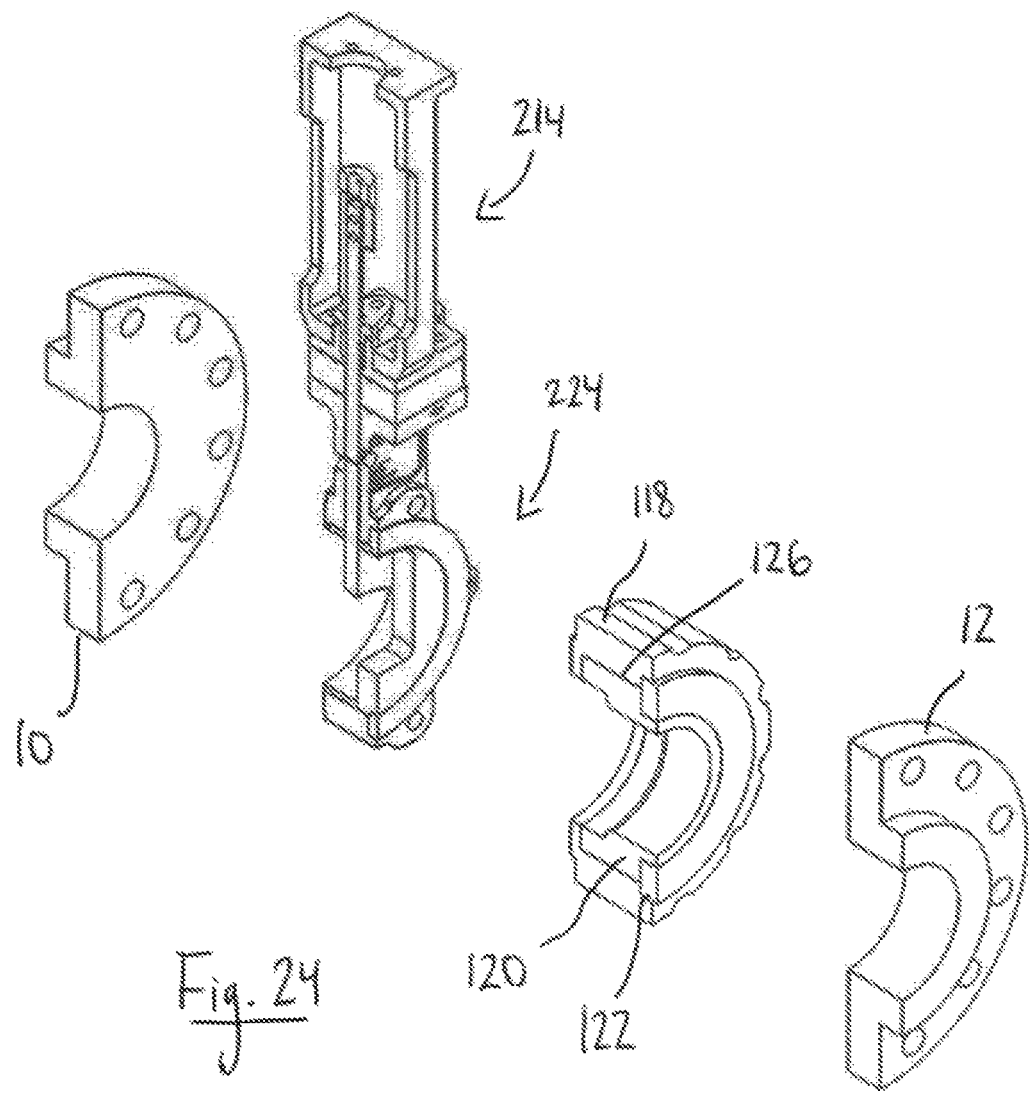
FIG. 24 is an exploded isometric section view of the flow centralizer and valve assembly of FIG. 19.

FIGS. 13 to 18 show yet another embodiment of a flow centralizer 216. The flow centralizer 216 is shown downstream of a butterfly valve 124 as part of a butterfly valve assembly 114. The flow centralizer has an insert 220, an orifice body 218 and a flange ring 222 with minor variations in shape and design of the insert 220 as compared to the embodiments of the inserts of the flow centralizers shown in FIGS. 3 to 7 and 12 to 17. The insert 220 has two sloped surfaces between a plurality of bores within the insert 220 forming a flowthrough bore as shown in FIG. 15. Many different shapes and orientations of the flowthrough bore in the insert 220 are possible. As shown in FIG. 14, there is a gap 250 between the exterior of the orifice body 218 and the outlet pipe spool 12.

FIGS. 19 to 24 show the flow centralizer 116 in position next to a gate valve body 224 (FIG. 23) as part of a gate valve assembly 214.

Figure 25:
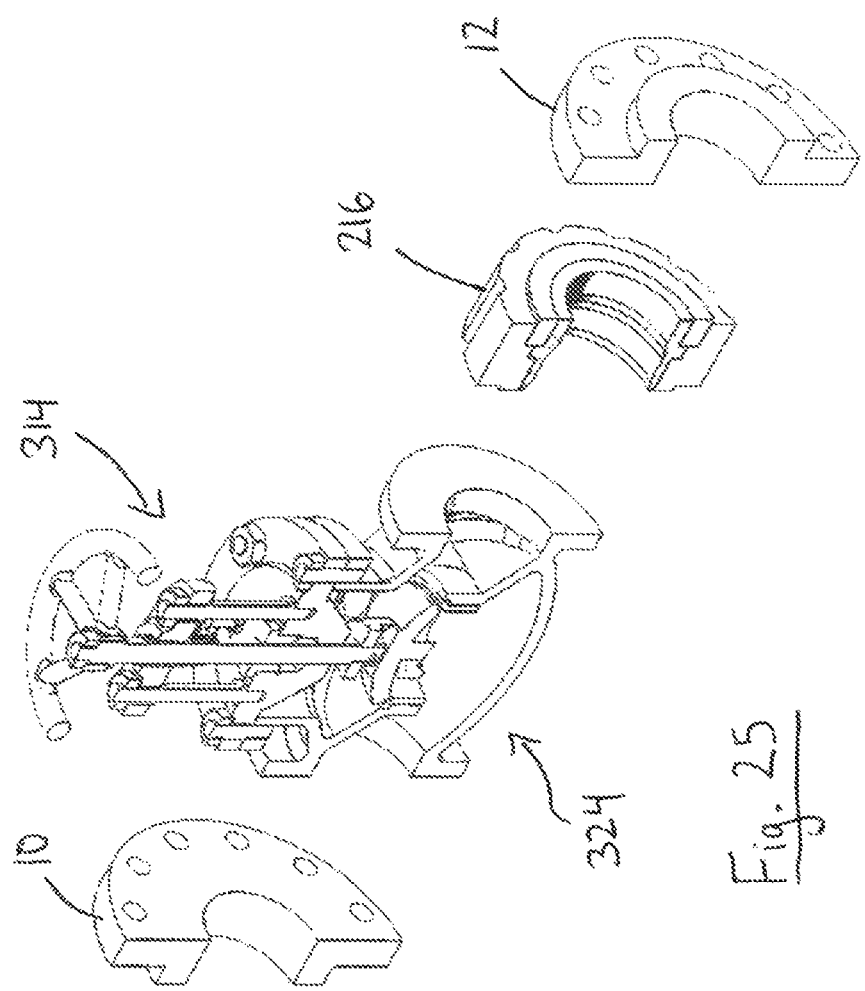
FIG. 25 is an exploded isometric section view of a flow centralizer and a globe valve assembly.
Figure 30:
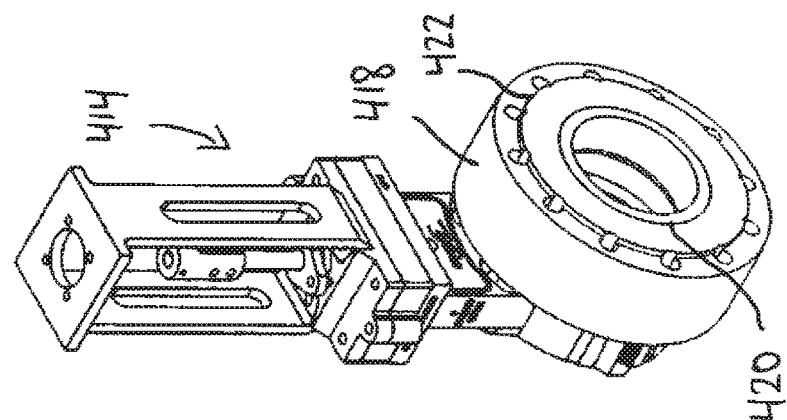
FIG. 30 is an isometric view of the flow centralizer of FIG. 27.

FIGS. 25 and 26 show the flow centralizer 216 in position next to a globe valve body 324 as part of a globe valve assembly 314.

Figure 29:
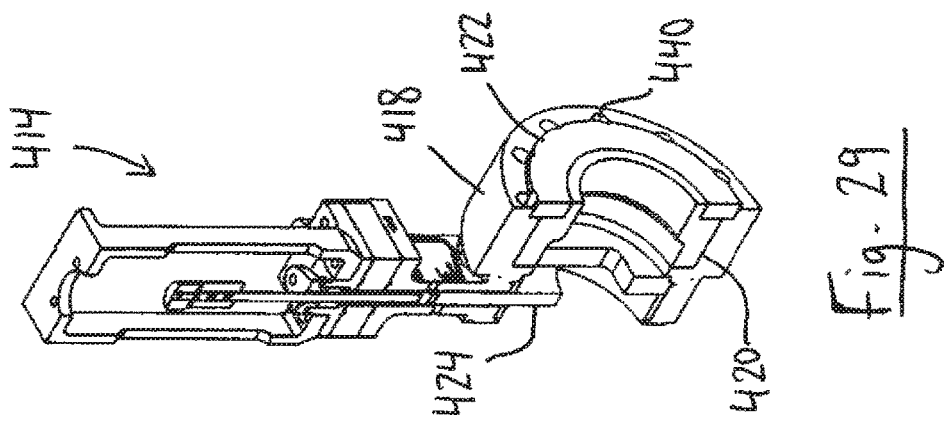
FIG. 29 is an isometric section view of the flow centralizer of FIG. 27.
Figure 28:
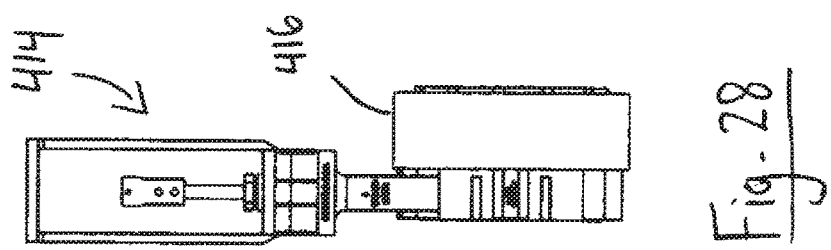
FIG. 28 is a front view of the flow centralizer of FIG. 27.
Figure 27:
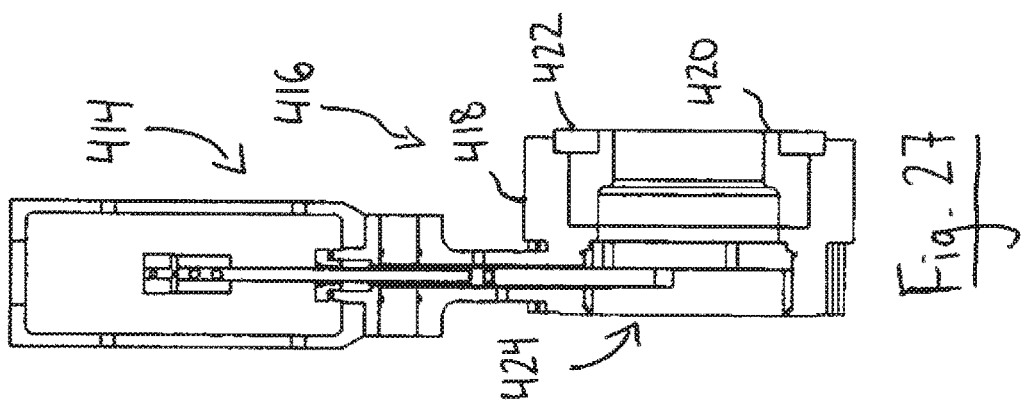
FIG. 27 is a front section view of a flow centralizer as an integral part of the valve.

FIGS. 27 to 30 show a flow centralizer 416 formed as an integral part of a valve body 424 of a valve assembly 414. As shown in FIG. 27, an orifice body 418 of the flow centralizer 416 is formed integral with the valve body 424. The flow centralizer 416 also includes an insert 420 and flange ring 422. The insert 420 provides a further example of a shape of flowthrough bore. As shown in FIG. 29, bolt holes 440 allow the flow centralizer 416 and valve body 424 to be connected to a pipe spool or other pipe component.

The inserts 20, 120, 220 and 420 described herein may be formed from tungsten carbide or other hard material. The inserts may also be formed with another hardened material, such as an overlay with hard-coated welding. The inserts may be replaced if they are worn out. The three-piece design of the flow centralizers allows them to be re-built using a new insert while in the field. The internal geometry of the flow centralizer can be custom made for each application. The orifice body may be made from carbon steel or other suitable material.

Each of the inserts, orifice bodies and flange rings described herein may have a variety of different shapes and designs so long as they can be held together in position between pipe components such as valve assemblies or pipe spools and provide a throughbore for fluid flow. The flow centralizers described herein may be manufactured separately from the valve body and provided to end users together with the valve assembly or as separate components. As shown in the embodiments of FIGS. 27 to 30, the flow centralizers may also be manufactured integrally as part of the valve body. In other embodiments the flow centralizer may be made out of a single component or two components or more than three components. Preferably, regardless of the design of flow centralizer, the flowthrough bore within the flow centralizer is made from a hardened material, such as, for example, tungsten carbide.

Figure 31:
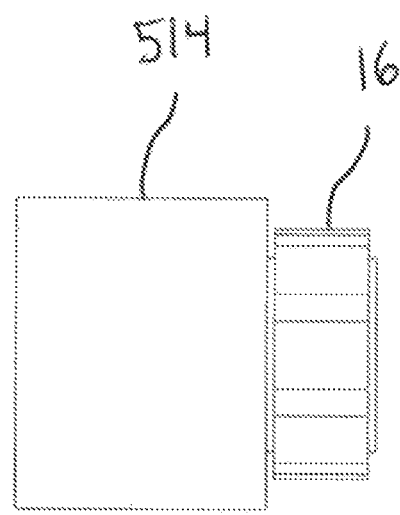
FIG. 31 is a schematic view of a flow centralizer and a valve assembly.

The various embodiments of wear spools or flow centralizers described herein can be used downstream of any valve, including a control valve or an isolation valve. The wear spool may be used to streamline the flow and protect downstream equipment such as piping. Various pipeline valves may be used with embodiments of wear spools described herein, including a gate valve (FIGS. 1 and 2), a globe valve (FIGS. 25 and 26) and butterfly valve (FIGS. 13-18) as examples. The wear spool may also be used with other types of valves such as shown in FIG. 31. The flow centralizer 16 is connected to a valve assembly 514 having a valve body. The valve assembly 514 shown in FIG. 31 may be any type of valve, and, for example, may be any one of the following types of valves: a pinch valve, a ball valve, a rotary control valve, an eccentric plug valve, a plug valve, a severe service valve and an angled control valve. Other embodiments and variations of flow centralizers may be connected to the various types of valve assemblies represented by valve assembly 514.

In a preferred embodiment, the flowthrough bore of the inserts 20, 120, 220 and 420 narrow in the direction downstream of the valve. By narrowing in the downstream direction, the flow through the flow centralizer is accelerated through the pipe and away from the pipe walls. When the flow centralizer is centered in the centre of the pipe, the fluid passing through the flow centralizer is directed into a central axis of the pipe. The flowthrough bore of the insert will have a smallest internal diameter that is smaller than the diameter of the pipe to which it is connected in order to centralize the fluid. The internal geometry of the inserts 20, 120, 220 and 420 can be varied in other embodiments with many different shapes and angles, providing a large combination of unique shapes to streamline the flow.

Immaterial modifications may be made to the embodiments described here without departing from what is covered by the claims.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A pipeline valve assembly, comprising:
    a pipeline valve arranged to control flow through a pipeline, the pipeline having an outlet pipe spool and an inlet pipe spool; and
    a flow centralizer downstream of the pipeline valve, the flow centralizer comprising:
    an orifice body defining a bore having a minimum diameter;
    an insert defining a flowthrough bore extending between a narrow end and a wide end of the flowthrough bore, the flowthrough bore having a smaller diameter at the narrow end, the insert having an insert flange defining a maximum external diameter;
    a flange ring defining a minimum internal diameter; and
    wherein the minimum diameter of the bore of the orifice body and the minimum internal diameter of the flange ring are each smaller than the maximum external diameter of the insert flange so that the insert flange is held in position between the flange ring and the orifice body when the flow centralizer is in use,
    wherein the pipeline valve and the flow centralizer are configured to be held in position by bolts connecting between the outlet pipe spool and the inlet pipe spool.

2. The pipeline valve assembly of claim 1 in which the flange ring sits within the bore of the orifice body when the flow centralizer is in use.

3. The pipeline valve assembly of claim 1 in which the flowthrough bore comprises a plurality of bores defining diameters, each of the bores having diameters that are smaller in size toward the narrow end.

4. The pipeline valve assembly of claim 1 in position downstream of the pipeline valve in which the flow centralizer is oriented with the wide end of the flowthrough bore closer to the valve.

5. The pipeline valve assembly of claim 4 in which the flow centralizer is adjacent to the pipeline valve.

6. The pipeline valve assembly of claim 1 in which the insert further comprises tungsten carbide.

7. The pipeline valve assembly of claim 1 in combination with a valve assembly with a valve body, and in which the flow centralizer is integral with the valve body.

8. The pipeline valve assembly of claim 7 in which the orifice body is integral with the valve body.

* * * * *